(12) United States Patent
Nemoto et al.

(10) Patent No.: US 7,395,371 B2
(45) Date of Patent: Jul. 1, 2008

(54) METHOD OF CONTROLLING A DATABASE MANAGEMENT SYSTEM BY CHANGING ALLOCATION OF CACHE MEMORY

(75) Inventors: Naokazu Nemoto, Yokohama (JP); Norifumi Nishikawa, Nachida (JP); Kazuhiko Mogi, Sagamihara (JP); Masaru Kitsuregawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 158 days.

(21) Appl. No.: 11/259,894

(22) Filed: Oct. 26, 2005

(65) Prior Publication Data

US 2007/0016716 A1 Jan. 18, 2007

(30) Foreign Application Priority Data

Jul. 15, 2005 (JP) ............................. 2005-207019

(51) Int. Cl.
G06F 12/00 (2006.01)
(52) U.S. Cl. ...................... 711/118; 711/156; 711/170; 707/2; 707/102
(58) Field of Classification Search ................. 711/118, 711/156, 170; 707/2, 102
See application file for complete search history.

(56) References Cited

U.S. PATENT DOCUMENTS

| | | | | |
|---|---|---|---|---|
| 5,812,996 A | * | 9/1998 | Rubin et al. ................... | 707/2 |
| 5,822,749 A | * | 10/1998 | Agarwal ........................ | 707/2 |
| 6,604,096 B1 | * | 8/2003 | Couch et al. ................... | 707/2 |
| 6,928,450 B2 | * | 8/2005 | Mogi et al. ................. | 707/102 |
| 6,996,556 B2 | * | 2/2006 | Boger et al. ................... | 707/3 |
| 2003/0093439 A1 | | 5/2003 | Mogi et al. | |
| 2003/0093442 A1 | | 5/2003 | Mogi et al. | |
| 2003/0093647 A1 | | 5/2003 | Mogi et al. | |
| 2004/0054648 A1 | | 3/2004 | Mogi et al. | |
| 2004/0193803 A1 | | 9/2004 | Mogi et al. | |

(Continued)

FOREIGN PATENT DOCUMENTS

JP 2004-295790 10/2004

(Continued)

OTHER PUBLICATIONS

Volker, Markl, et al., "Robust Query Processing Through Progressive Optimization", Sigmod 2004, Jun. 13-18, 2004, Paris, France.

(Continued)

*Primary Examiner*—Stephen Elmore
(74) *Attorney, Agent, or Firm*—Townsend and Townsend and Crew LLP

(57) ABSTRACT

Provided is a computer system, including: at least one of database computers, in which a database management system operates; a storage system for storing a database operated by the database management system; and a management computer for managing the database computer and the storage system, the storage system having a cache memory for storing data temporarily and a physical disk drive for storing the database, in which the management computer changes capacity of the cache memory which is allocated to the database computer where the database management system operates, and instructs the database management system to change an access plan according to the change in capacity of the cache memory allocated to the database computer.

21 Claims, 16 Drawing Sheets

U.S. PATENT DOCUMENTS

2004/0193807 A1   9/2004   Mogi et al.
2004/0193827 A1*  9/2004   Mogi et al. ................. 711/170
2005/0223174 A1   10/2005  Mogi et al.
2006/0236033 A1*  10/2006  Guinn et al. ................ 711/118
2006/0265351 A1*  11/2006  Day et al. ..................... 707/2

OTHER PUBLICATIONS

Naoya Takahashi, PH.D., et al., Hitachi Tagma Store Universal Storage Platform, Hitachi Data Systems, Oct. 2004.

* cited by examiner

| 5101 | 5102 | 5103 | 5104 | 5105 | 5106 |
|---|---|---|---|---|---|
| SCHEMA ID | SCHEMA NAME | SCHEMA TYPE | DATA AREA ID | SCHEMA SIZE | HEAD OFFSET ADDRESS |
| 0 | T1 | TABLE | 0 | 128MB | 128 |
| 1 | T2 | TABLE | 0 | 128MB | 260000 |
| 2 | I1 | INDEX | 1 | 64MB | 520000 |

5100
DB SCHEMA INFORMATION TABLE

FIG.5A

| 5201 | 5202 | 5203 | 5204 |
|---|---|---|---|
| DATA AREA ID | AREA NAME | DB FILE SYSTEM NAME | AREA SIZE |
| 0 | DB1 | /DB1 | 1GB |
| 1 | DB2 | /DB2 | 1GB |

5200
DATA AREA INFORMATION TABLE

FIG.5B

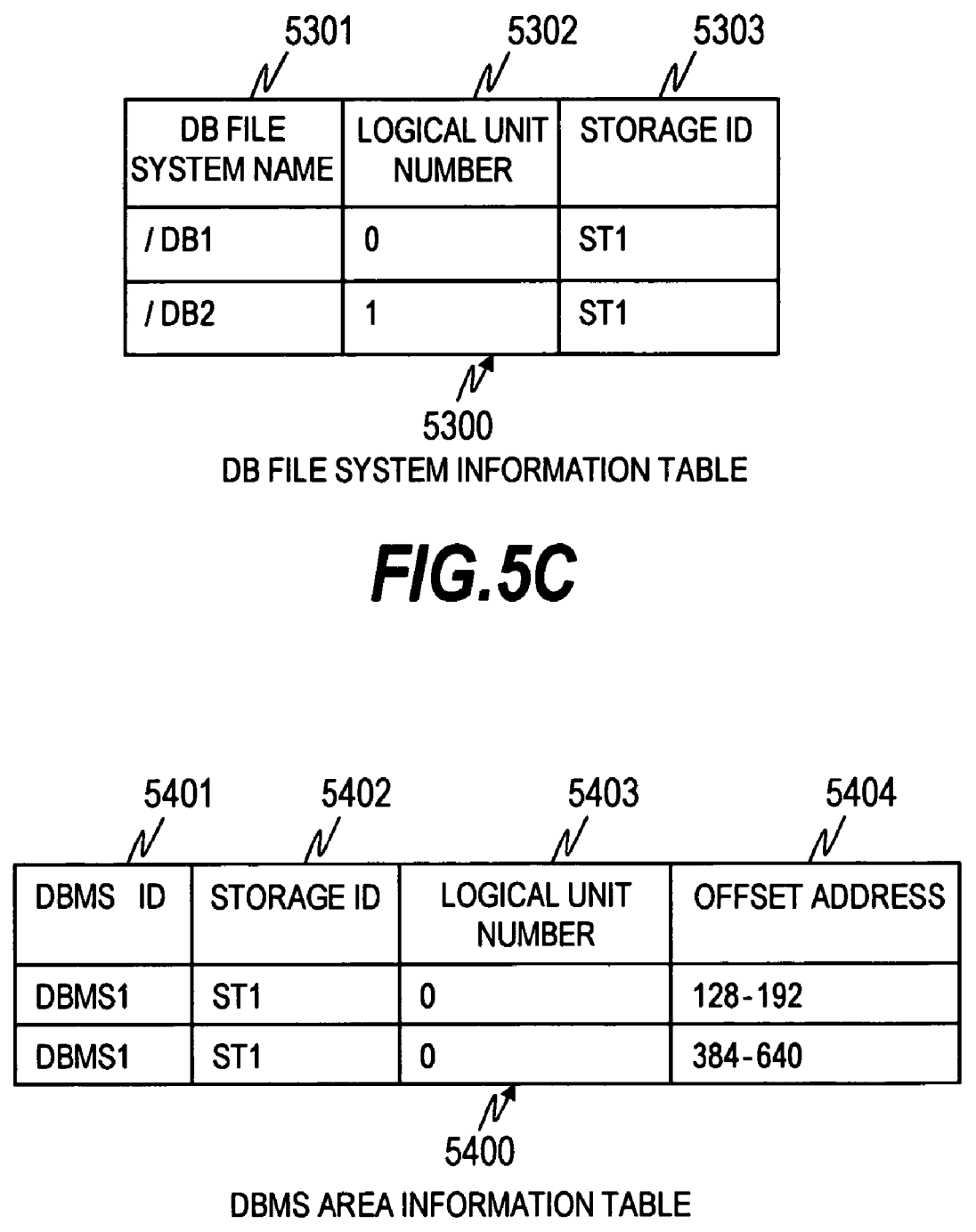

| 5301 | 5302 | 5303 |
|---|---|---|
| DB FILE SYSTEM NAME | LOGICAL UNIT NUMBER | STORAGE ID |
| /DB1 | 0 | ST1 |
| /DB2 | 1 | ST1 |

5300
DB FILE SYSTEM INFORMATION TABLE

FIG.5C

| 5401 | 5402 | 5403 | 5404 |
|---|---|---|---|
| DBMS ID | STORAGE ID | LOGICAL UNIT NUMBER | OFFSET ADDRESS |
| DBMS1 | ST1 | 0 | 128-192 |
| DBMS1 | ST1 | 0 | 384-640 |

5400
DBMS AREA INFORMATION TABLE

FIG.5D

| 8401 | 8402 |
|---|---|
| CACHE ALLOCATED HOST ID | CACHE ADDRESS |
| HOST1 | 128-60000 |
| HOST2 | 60001-90000 |

8400
CACHE ALLOCATION MANAGEMENT TABLE

FIG.6A

| 8501 | 8502 | 8503 |
|---|---|---|
| CACHE ADDRESS | LOGICAL UNIT NUMBER | OFFSET ADDRESS |
| 128-192 | 0 | 128-192 |
| 384-640 | 0 | 193-448 |
| 16800-17440 | 1 | 520128-520768 |

8500
CACHE DATA MANAGEMENT TABLE

FIG.6B

| NODE PLAN NAME | PLAN PARENT NODE NAME | NODE PROCESSING | ACCESS DATA CONFIGURATION | PROCESSING ORDER | NODE PROCESSING DETAIL |
|---|---|---|---|---|---|
| N1 | ROOT | SUM | | 3 | SUM (T1.B) |
| N2 | N1 | NEST LOOP JOIN | | 3 | T1.A = T2.A |
| N3 | N2 | TABLE ACCESS BY INDEX | T1 | 3 | |
| N4 | N2 | HASH JOIN | | 3 | T2.M = T3.M |
| N5 | N4 | TABLE ACCESS FULL | T2 | 1 | TABLE SCAN T2 |
| N6 | N4 | TABLE ACCESS FULL | T3 | 2 | TABLE SCAN T2 |
| N7 | N3 | INDEX ACCESS | I1 | 3 | RESULT OF N4 |

ACCESS PLAN INFORMATION TABLE 7200

FIG. 7A

| 7301 | 7302 | 7303 | 7304 | 7305 | 7306 | 7307 |
|---|---|---|---|---|---|---|
| STORAGE ID | CACHE ADDRESS | HOST ID | DBMS ID | HIT COUNT | LOGICAL UNIT NUMBER | OFFSET ADDRESS |
| ST1 | 128-192 | HOST1 | DBMS1 | 1 | 0 | 128-192 |
| ST1 | 384-640 | HOST1 | DBMS1 | 1 | 0 | 193-448 |
| ST1 | 16800-17440 | HOST1 | DBMS1 | 5 | 1 | 520128-520768 |

7300
STORAGE CACHE MANAGEMENT TABLE

FIG.7B

| 7401 | 7402 | 7403 |
|---|---|---|
| STORAGE ID | CACHE ADDRESS | ALLOCATED HOST ID |
| ST1 | 128-6000 | HOST2 |
| ST1 | 60001-65001 | HOST3 |

7400
STORAGE CACHE ALLOCATION MANAGEMENT TABLE

FIG.7C

| 7501 | 7502 | 7503 | 7504 |
|---|---|---|---|
| TABLE/INDEX NAME | STRING NAME | LENGTH | ENTRY COUNT |
| T1 | A | 10 | 10000 |
| I1 | A | 10 | 5000 |

7500
DBMS STATISTICS INFORMATION TABLE

FIG.7D

| 7601 | 7602 | 7603 | 7604 | 7605 | 7606 | 7607 | 7608 | 7609 |
|---|---|---|---|---|---|---|---|---|
| HOST ID | DBMS ID | SCHEMA NAME | SCHEMA TYPE | SCHEMA SIZE | DATA AREA ID | HEAD OFFSET ADDRESS | LOGICAL UNIT NUMBER | STORAGE ID |
| HOST 1 | DBMS 1 | T1 | TABLE | 128MB | 0 | 128 | 0 | ST 1 |
| HOST 1 | DBMS 1 | T2 | TABLE | 128MB | 0 | 260000 | 0 | ST 1 |
| HOST 1 | DBMS 1 | I1 | INDEX | 64MB | 1 | 520000 | 1 | ST 1 |
| HOST 1 | DBMS 1 | T3 | TABLE | 128MB | 2 | 128 | 1 | ST 1 |

7600
CONFIGURATION INFORMATION TABLE

FIG. 7E

| 7701 | 7702 | 7703 | 7704 |
|---|---|---|---|
| DBMS ID | HOST ID | THROUGHPUT INFORMATION | MAXIMUM DISK QUEUE LENGTH |
| DBMS1 | HOST1 | 10000 | 10 |

7700
DBMS PERFORMANCE INFORMATION TABLE

METHOD OF CONTROLLING A DATABASE MANAGEMENT SYSTEM BY CHANGING ALLOCATION OF CACHE MEMORY

CLAIM OF PRIORITY

The present application claims priority from Japanese patent application P2005-207019 filed on Jul. 15, 2005, the content of which is hereby incorporated by reference into this application.

BACKGROUND

This invention relates to a computer system that includes a database management system for operating a database. More specifically, this invention relates to a technique of selecting an optimum access plan.

Today, business and other organizations store an enormous amount of data in a database (DB), and a database management system (DBMS), which collects data from a DB plays an important role in running of such an organization.

In general, a DBMS operates on a server. The server is connected to a storage system and stores DB data in the connected storage system.

A DBMS performs the following processing:

When receiving an inquiry from a client, a DBMS first conducts optimization processing. Optimization processing is processing executed to select an access plan that is most efficient in executing the inquiry made by the client. The DBMS then accesses a DB based on the chosen access plan.

Further, there are known two types of optimization processing: rule-based optimization processing and cost-based optimization processing.

In the rule-based optimization processing, an access plan is determined based on how a code (SQL statement) used by a client to make an inquiry is stated or the like. In the cost-based optimization processing, an access plan is determined based on such information as the speed of CPU (CPU cost) of the server on which the DBMS operates.

A client has to have considerable knowledge to enable a DBMS to employ rule-based optimization processing. It is therefore common for a DBMS to employ cost-based optimization processing.

An example of optimization processing employed by a DBMS is disclosed in Volker Markl, Vijayshankar Raman, David Simmen, Guy Lohman, Hamid Pirahes, Miso Cilimdzic: "Robust query processing through progressive optimization", Proc. Of the 2004 ACM SIGMOD International Conference on Management of Data, 2004, p. 659-670.

According to this publication, a technique is known which changes an access plan during execution of the access plan if there is another executable access plan that is lower in cost.

The storage system receives a request (write request or read request) from the server to which it is connected and on which the DBMS operates, and processes the request as follows:

The storage system has a disk drive and a cache memory. The disk drive is a non-volatile storage medium (e.g., hard disk drive) where data is stored. The cache memory is a volatile storage medium (e.g., semiconductor memory) where data is stored temporarily.

Upon reception of a read request from the server, the storage system judges whether requested data is stored in the cache memory or not.

When the requested data is stored in the cache memory, the storage system reads the data out of the cache memory and sends the read data to the server, whereby the processing is ended.

Generally speaking, data is read out of a cache memory quicker than out of a disk drive. A storage system therefore can respond to a request of a server faster by reading data out of a cache memory instead of a disk drive.

Usually, a storage system has one cache memory and is connected to plural servers. The cache memory in this case is shared among the plural servers connected to the storage system. How much of the cache memory each of the servers is allowed to use is not regulated.

For that reason, when one of the servers makes a request to read a large amount of data, the cache memory is used up by this server and applications of other servers that share the cache memory are lowered in performance.

This problem can be solved by a technique disclosed in an internet article, Hitachi TagmaStore Universal Storage Platform (URL: http://www.hds.com/pdf/wp168_tagmastore_virtualization.pdf).

This technique allocates a part of the memory area of a cache memory to each server, which uses the allocated area exclusively.

JP 2004-295790 A discloses a technique with which a part of the memory area of a cache memory that is allocated to one server can be reallocated to another server. This technique allows a server to have a part of the memory area of a cache memory that is allocated to another server when an application in the former server fails to meet a required performance level. With an additional portion of the memory area provided by another server, the application in the former server can now meet the required performance level.

SUMMARY

However, according to the above prior art, a DBMS cannot recognize a change in how much capacity of the memory area of a cache memory is allocated (allocated amount capacity of the cache) to a server on which the DBMS operates. Accordingly, the DBMS makes an access plan for accessing a DB without taking into consideration a change in allocated cache amount. This prevents the DBMS from utilizing the allocated cache amount effectively and from improving the performance.

An embodiment of this invention has been made in view of the problem described above, and it is therefore an object of this invention to provide a computer system that allows a DBMS to utilize its allocated cache amount effectively.

According to the embodiment of this invention, there is provided a computer system including: at least one of database computers, in which a database management system operates; a storage system for storing a database operated by the database management system; and a management computer for managing the DBMS computer and the storage system. The storage system has a cache memory where data is temporarily stored and a physical disk drive where the database is stored. The management computer changes capacity of the cache memory which is allocated to the DBMS computer where the database management system operates, and instructs the database management system to change an access plan according to the change in amount of the cache memory allocated to the database computer.

According to the embodiment of this invention, the DBMS can effectively use the memory area of the cache memory of the storage system.

BRIEF DESCRIPTION OF THE DRAWINGS

The present invention can be appreciated by the description which follows in conjunction with the following figures, wherein:

FIG. 5A is a configuration diagram of a DB schema information table provided in the DBMS server according to the embodiment of this invention;

FIG. 5B is a configuration diagram of a data area information table provided in the DBMS server according to the embodiment of this invention;

FIG. 5C is a configuration diagram of a DB file system information table provided in the DBMS server according to the embodiment of this invention;

FIG. 5D is a configuration diagram of a DBMS area information table provided in the DBMS server according to the embodiment of this invention;

FIG. 6A is a configuration diagram of a cache allocation management table provided in the storage system according to the embodiment of this invention;

FIG. 6B is a configuration diagram of a cache data management table provided in the storage system according to the embodiment of this invention;

FIG. 7A is a configuration diagram of an access plan information table provided in the management server according to the embodiment of this invention;

FIG. 7B is a configuration diagram of a storage cache management table provided in the management server according to the embodiment of this invention;

FIG. 7C is a configuration diagram of a storage cache allocation management table provided in the management server according to the embodiment of this invention;

FIG. 7D is a configuration diagram of a DBMS statistics information table provided in the management server according to the embodiment of this invention;

FIG. 7E is a configuration diagram of a configuration information table provided in the management server according to the embodiment of this invention;

FIG. 7F is a configuration diagram of a DBMS performance information table provided in the management server according to the embodiment of this invention;

DETAILED DESCRIPTION OF THE PREFERRED EMBODIMENT

An embodiment of this invention will be described below with reference to the accompanying drawings.

Figure 1:
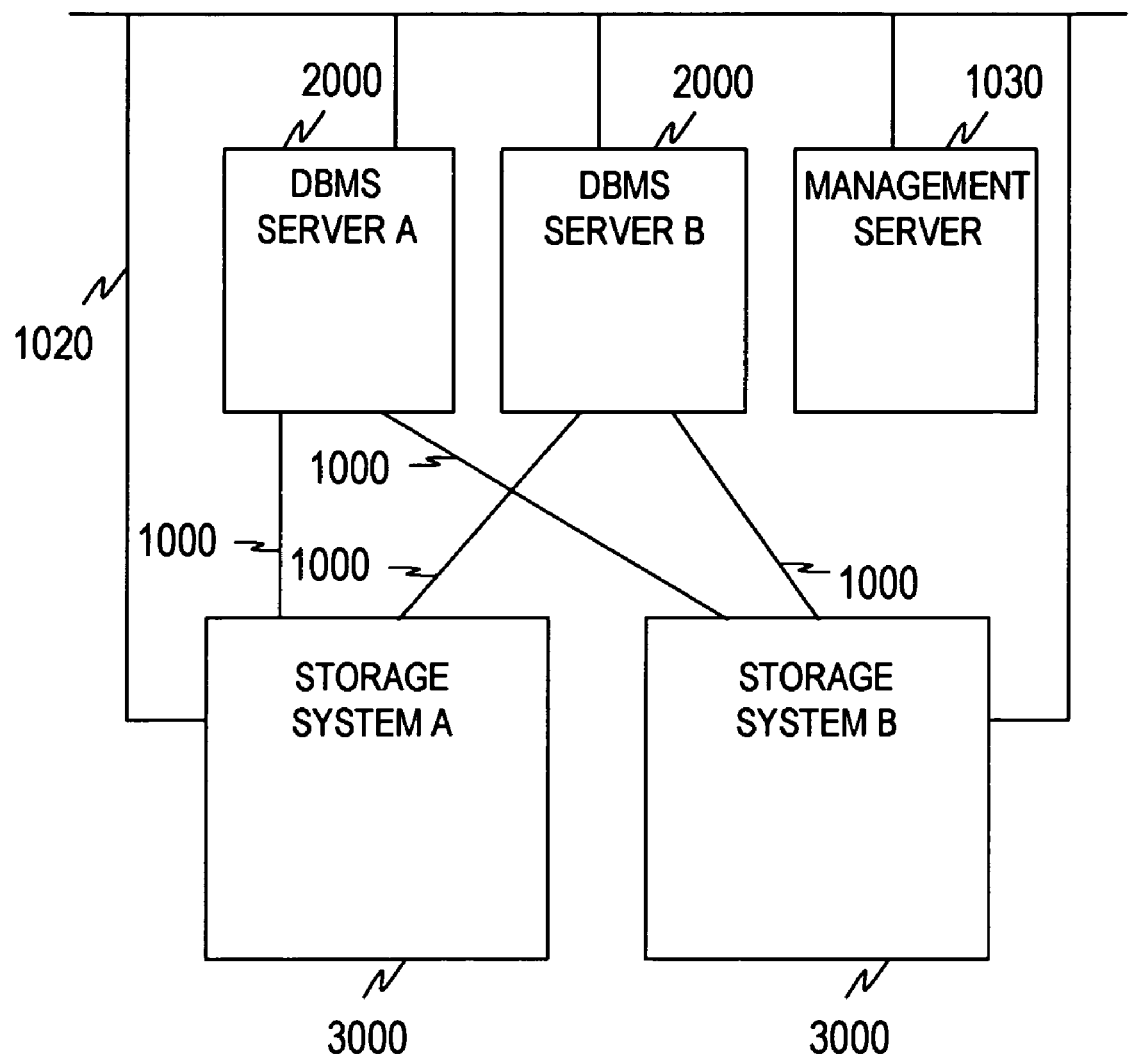
FIG. 1 is a block diagram of a computer system according to an embodiment of this invention.

FIG. 1 is a block diagram of a computer system according to an embodiment of this invention.

The computer system has DBMS servers, each of which is denoted by 2000, storage systems, each of which is denoted by 3000, and a management server 1030.

The DBMS server 2000, the storage system 3000 and the management server 1030 are connected to one another via a network 1020. The network 1020 is, for example, a local area network (LAN). The network 1020 may have a network appliance such as a router.

The DBMS server 2000 and the storage system 3000 are connected to each other via a network 1000. The network 1000 is, for example, a Fibre Channel (FC) network. The network 1000 may have a network appliance such as an FC switch.

The storage system 3000 has, as will be described later with reference to FIG. 3, a physical disk where a database (DB) is stored. There are two storage systems 3000 and 3000 in FIG. 1, but the computer system of this embodiment can have as many storage systems as necessary.

The DBMS server 2000 executes, as will be described later with reference to FIG. 2, a database management system (DBMS). The DBMS is a program executed by the DBMS server 2000, and controls a DB stored in the storage system 3000. Controlling a DB includes updating the DB, searching the DB, creating a table, and defining a table. There are two DBMS servers 2000 and 2000 in FIG. 1, but the computer system of this embodiment can have as many DBMS servers as necessary.

The management server 1030 manages, as will be described later with reference to FIG. 4, the DBMS server 2000 and the storage system 3000.

Specifically, the management server 1030 obtains, when detecting reallocation of a cache area of a cache memory in the storage system 3000, an access plan from the DBMS server 2000 whose allocated amount capacity of the cache is changed. From the obtained access plan, the management server 1030 creates an access plan that is according to the newly allocated cache amount. The management server 1030 then instructs the DBMS server 2000 to switch to the created access plan. Receiving the instruction, the DBMS server 2000 employs the access plan designated. The DBMS server 2000 thus chooses an access plan that makes high-speed processing possible.

The management server 1030 may be an independent computer, or may be a part of the DBMS server 2000 or of the storage system 3000.

The computer system may have a computer (client) that accesses the DBMS server 2000.

Figure 2:
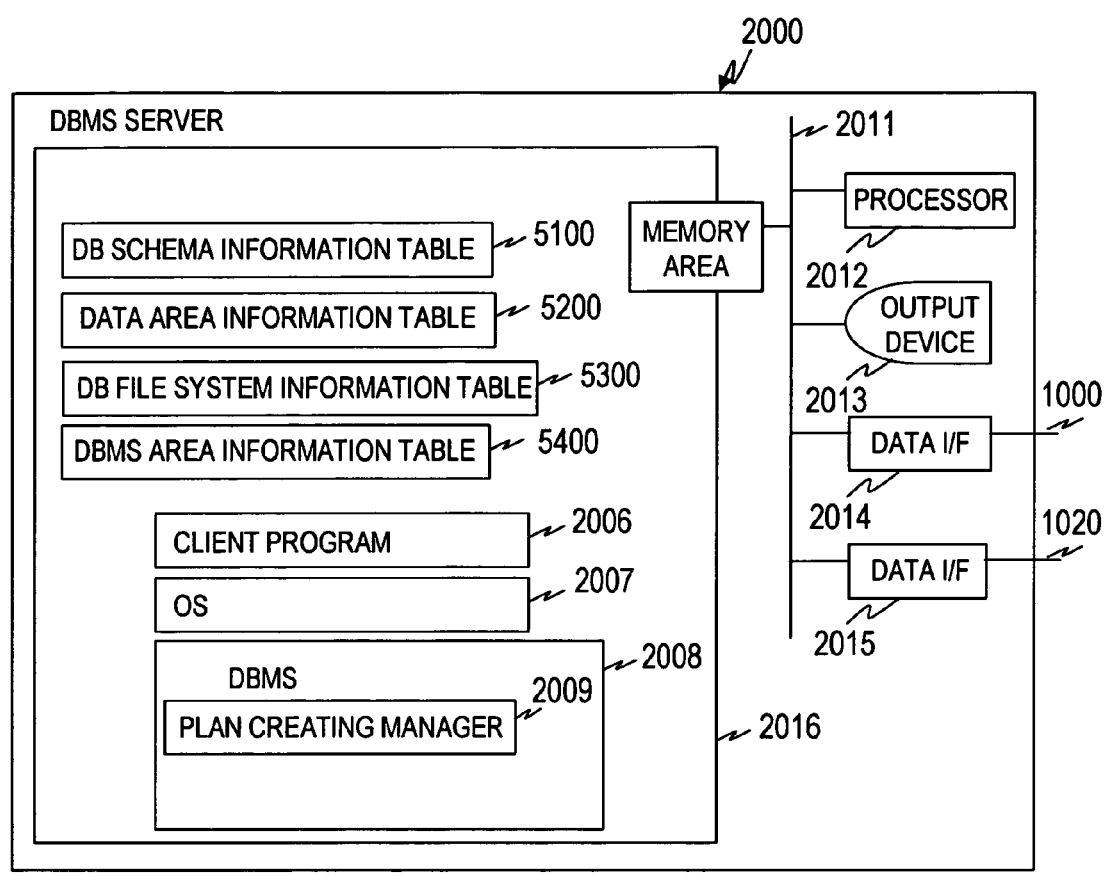
FIG. 2 is a block diagram of a DBMS server according to the embodiment of this invention.

FIG. 2 is a block diagram of the DBMS server 2000 according to the embodiment of this invention.

The DBMS server 2000 has a processor 2012, a memory area 2016, an Ether I/F 2015, an FC I/F 2014, and an output device 2013.

The devices constituting the DBMS server 2000 are interconnected via a communication path 2011, which is an internal bus or the like. There are one Ether I/F 2015 and one FC I/F 2014 in FIG. 2, but the DBMS server 2000 may have plural Ether I/Fs and plural FC I/Fs.

The processor 2012 executes programs stored in the memory area 2016 to perform various types of processing.

The Ether I/F 2015 is an interface connected to an external device via the network 1020. The Ether I/F 2015 uses an Ethernet protocol to communicate. External devices to which the Ether I/F 2015 is connected include the management server 1030, the storage system 3000 and clients.

The FC I/F 2014 is an interface connected to an external device via the network 1000. The FC I/F 2014 uses a Fibre channel protocol to communicate. External devices to which the FC I/F 2014 is connected include the storage system 3000.

The output device 2013 is, for example, a display, and outputs various types of information.

The memory area 2016 stores an operating system (OS) 2007, a DBMS 2008, a client program 2006, a DB schema information table 5100, a data area information table 5200, a DB file system information table 5300, a DBMS area information table 5400, etc.

The OS 2007 controls the overall management of the DBMS server 2000. The OS 2007 includes DB file systems. A DB file system obtains a file from a DB stored in the storage system 3000, and provides the obtained file to another program.

The client program 2006 inquires, when receiving a data request from a client, of the DBMS 2008 about the requested data.

The DBMS 2008 contains a plan creating manager 2009, and controls a DB stored in the storage system 3000. The plan creating manager 2009 creates an access plan upon receiving an inquiry from the client program 2006.

The memory area 2016 may store more than one DBMS 2008. In this case, each DBMS 2008 is given a unique identifier.

The DB schema information table 5100 shows, as will be described later with reference to FIG. 5A, information on the logical configuration (DB schema) of a DB managed by the DBMS 2008.

The data area information table 5200 shows, as will be described later with reference to FIG. 5B, information on a data area managed by the OS 2007.

The DB file system information table 5300 shows, as will be described later with reference to FIG. 5C, information necessary for the OS 2007 to access a DB.

The DBMS area information table 5400 shows, as will be described later with reference to FIG. 5D, information on a physical disk of the storage system 3000 accessed by the DBMS 2008.

Figure 3:
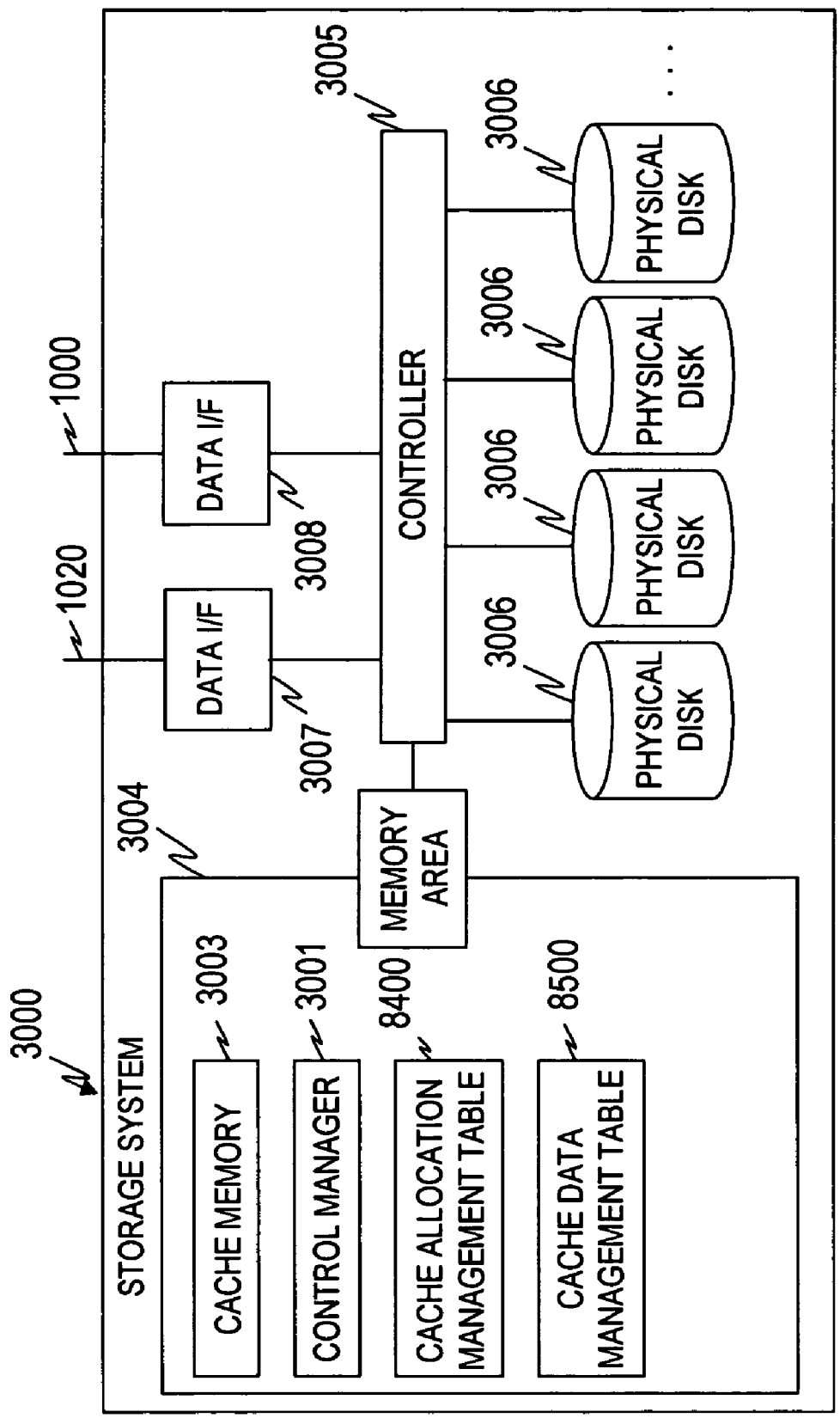
FIG. 3 is a block diagram of a storage system according to the embodiment of this invention.

FIG. 3 is a block diagram of the storage system 3000 according to the embodiment of this invention.

The storage system 3000 has a controller 3005, a memory area 3004, physical disks, each of which is denoted by 3006, an Ether I/F 3007 and an FC I/F 3008.

There are one Ether I/F 3007 and one FC I/F 3008 in FIG. 3, but the storage system 3000 may have plural Ether I/Fs and plural FC I/Fs. There are four physical disks 3006, 3006, 3006 and 3006 in FIG. 3, but the storage system 3000 can have as many physical disks as necessary.

The controller 3005 has the overall control over the storage system 3000. The controller 3005 has a CPU and other components to perform various types of processing by executing programs stored in the memory area 3004.

The Ether I/F 3007 is an interface connected to an external device via the network 1020. External devices to which the Ether I/F 3007 is connected include the management server 1030 and the DBMS server 2000.

The FC I/F 3008 is an interface connected to an external device via the network 1000. External devices to which the FC I/F 3008 is connected include the DBMS server 2000.

The physical disk 3006 stores information including a DB. The DBMS server 2000 recognizes the physical disk 3006 as a logical unit. In other words, the DBMS server 2000 uses a logical unit number and an offset address to access data stored in the physical disk 3006. An offset address is a relative address, which is unique only within the logical unit in question.

The physical disk 3006 may have a RAID configuration. In this case, the DBMS server 2000 uses a logical unit number and a logical address to access data stored in the physical disk 3006.

The memory area 3004 is provided in a non-volatile memory device. The memory area 3004 contains an area used as a cache memory 3003. Stored in the memory area 3004 are a cache allocation management table 8400, a cache data management table 8500, a control manager 3001, and the like.

The cache allocation management table 8400 shows, as will be described later with reference to FIG. 6A, information on how the capacity of the cache memory 3003 is allocated.

The cache data management table 8500 shows, as will be described later with reference to FIG. 6B, information on data stored in the cache memory 3003.

The control manager 3001 retrieves, in response to a request from the management server 1030, data stored in the physical disk 3006, and stores the retrieves data in the cache memory 3003.

Figure 4:
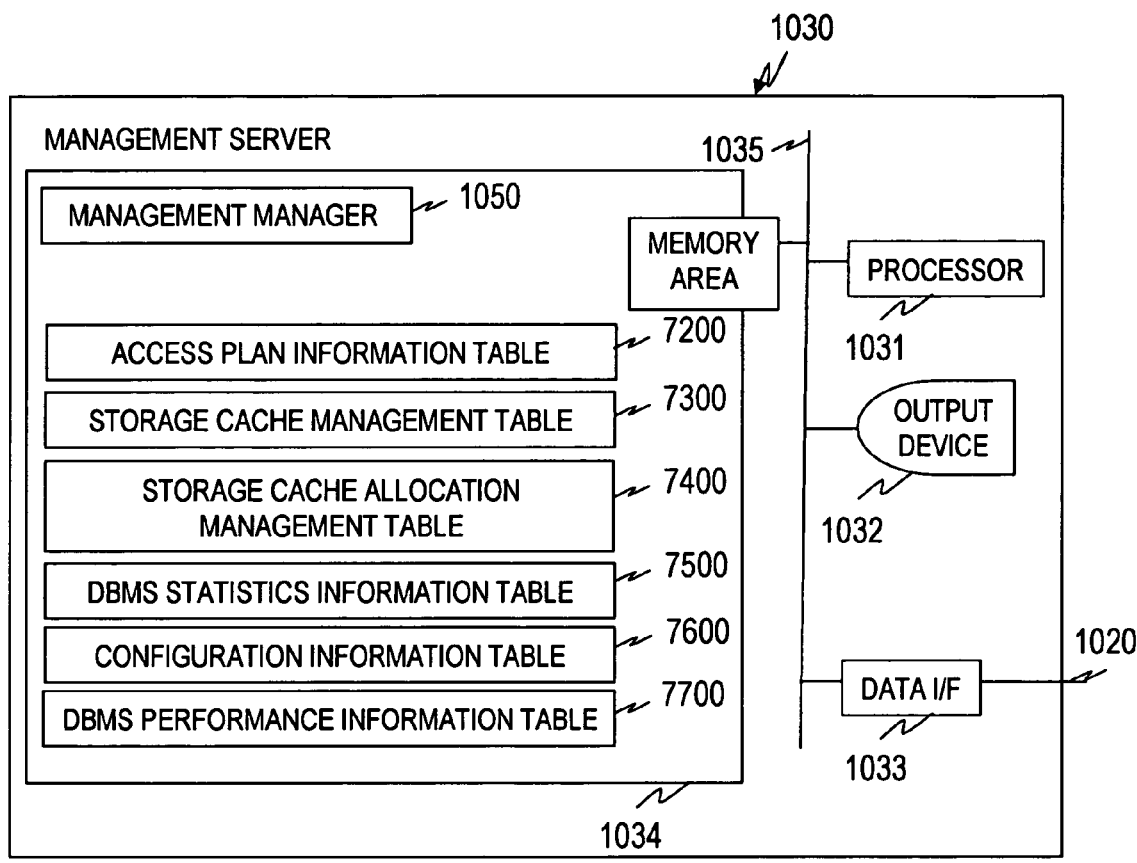
FIG. 4 is a block diagram of a management server according to the embodiment of this invention.

FIG. 4 is a block diagram of the management server 1030 according to the embodiment of this invention.

The management server 1030 has a processor 1031, a memory area 1034, an Ether I/F 1033 and an output device 1032. The devices constituting the management server 1030 are interconnected via a communication path 1035, which is an internal bus or the like.

There is one Ether I/F 1033 in FIG. 4, but the management server 1030 may have plural Ether I/Fs.

The Ether I/F 1033 is an interface connected to an external device via the network 1020. External devices to which the Ether I/F 1033 is connected include the DBMS server 2000 and the storage system 3000.

The output device 1032 is, for example, a display, and outputs various types of information.

Stored in the memory area 1034 are a management manager 1050, an access plan information table 7200, a storage cache management table 7300, a storage cache allocation management table 7400, a DBMS statistics information table 7500, a configuration information table 7600, a DBMS performance information table 7700 and others.

The management manager 1050 detects reallocation of a cache area of the cache memory 3003 in the storage system 3000, and then instructs the DBMS 2008 to change an access plan. Details of processing of the management manager 1050 will be described later with reference to FIGS. 12 and 13.

The access plan information table 7200 shows, as will be described later with reference to FIG. 7A, information on an access plan created by the DBMS server 2000.

The storage cache management table 7300 shows, as will be described later with reference to FIG. 7B, information on data stored in the cache memory 3003 of the storage system 3000.

The storage cache allocation management table 7400 shows, as will be described later with reference to FIG. 7C, the history of reallocation of cache areas of the cache memory 3003 in the storage system 3000.

The DBMS statistics information table 7500 shows, as will be described later with reference to FIG. 7D, information on a table and an index that are contained in a DB stored in the storage system 3000.

The configuration information table 7600 shows, as will be described later with reference to FIG. 7E, information on a DB stored in the storage system 3000.

The DBMS performance information table 7700 shows, as will be described later with reference to FIG. 7F, information on the performance of the DBMS 2008 in the DBMS server 2000.

FIG. 5A is a configuration diagram of the DB schema information table 5100 provided in the DBMS server 2000 according to the embodiment of this invention.

The DB schema information table 5100 holds information on a DB schema managed by the DBMS 2008. The DB schema information table 5100 contains a schema ID 5101, a schema name 5102, a schema type 5103, a data area ID 5104, a schema size 5105 and a head offset address 5106.

The schema ID 5101 is a unique identifier indicating a DB schema managed by the DBMS 2008. The schema name 5102 indicates the name of the DB schema identified by the schema ID 5101. The schema type 5103 indicates the type of this DB schema, with "table", "index", or the like being stored as the schema type 5103.

The data area ID 5104 is a unique identifier indicating a data area where this DB schema is stored. The schema size 5105 indicates the size of the DB schema. The head offset address 5106 indicates a value at the head of the offset address of a part of the storage area of the physical disk 3006 where this DB schema is stored. A DB schema is stored in a part of the storage area of the physical disk 3006 in the storage system 3000.

FIG. 5B is a configuration diagram of the data area information table 5200 provided in the DBMS server 2000 according to the embodiment of this invention.

The data area information table 5200 holds information on a data area managed by the OS 2007.

The data area information table 5200 contains a data area ID 5201, an area name 5202, a DB file system name 5203 and an area size 5204. The data area information table 5200 holds as many records (entries) as the number of DB file systems included in the OS 2007.

The data area ID 5201 is a unique identifier indicating data area which the DBMS 2008 identifies. The area name is the name of the data area identified by the data area ID 5201. The DB file system name 5203 indicates the name of a DB file system that manages this data area. The area size 5204 indicates the size of this data area.

FIG. 5C is a configuration diagram of the DB file system information table 5300 provided in the DBMS server 2000 according to the embodiment of this invention.

The DB file system information table 5300 holds information used when the OS 2007 of the DBMS server 2000 reads or writes data. The DB file system information table 5300 contains a DB file system name 5301, a logical unit number 5302 and a storage ID 5303.

The DB file system name 5301 indicates the name of a DB file system included in the OS 2007 of the DBMS server 2000.

The logical unit number 5302 is a unique identifier indicating a logical unit that is managed by the DB file system identified by the DB file system name 5301.

The storage ID 5303 is a unique identifier indicating a storage system to which the logical unit managed by this DB file system belongs. For example, World Wide Name (WWN) is stored as the storage ID 5303.

FIG. 5D is a configuration diagram of the DBMS area information table 5400 provided in the DBMS server 2000 according to the embodiment of this invention.

The DBMS area information table 5400 contains a DBMS ID 5401, a storage ID 5402, a logical unit number 5403, and an offset address 5404.

The DBMS ID 5401 is a unique identifier indicating the DBMS 2008 operating on the DBMS server 2000.

The storage ID 5402 is a unique identifier indicating the storage system 3000 that has the physical disk 3006 whose storage area is used by the DBMS 2008 that is identified by the DBMS ID 5401. The logical unit number 5403 is a unique identifier indicating a logical unit that is used by this DBMS 2008. The offset address 5404 indicates the offset address of a part of the storage area of the physical disk 3006 that is used by this DBMS 2008.

FIG. 6A is a configuration diagram of the cache allocation management table 8400 provided in the storage system 3000 according to the embodiment of this invention.

The cache allocation management table 8400 shows how the capacity of the cache memory 3003 in the storage system 3000 is allocated.

The cache allocation management table 8400 contains a cache allocated host ID 8401 and a cache address 8402.

The cache allocated host ID 8401 is a unique identifier indicating the DBMS server 2000 to which a part of the storage area of the cache memory 3003 (a cache area) in the storage system 3000 is allocated.

The cache address 8402 indicates the address of a cache area (cache address) allocated to the DBMS server 2000 that is identified by the cache allocated host ID 8401.

FIG. 6B is a configuration diagram of the cache data management table 8500 provided in the storage system 3000 according to the embodiment of this invention.

The cache data management table 8500 shows the relation between data stored in the cache memory 3003 and data stored in the physical disk 3006.

The cache data management table 8500 contains a cache address 8501, a logical unit number 8502, and an offset address 8503.

The cache address 8501 indicates the address of a cache area where data is stored.

The logical unit number 8502 is a unique identifier indicating a logical unit that stores the same data as the one stored in the cache area that is located at the address entered as the cache address 8501. The offset address 8503 indicates the offset address of a part of the storage area of the physical disk 3006 that stores the same data as the one stored in this cache area.

FIG. 7A is a configuration diagram of the access plan information table 7200 provided in the management server 1030 according to the embodiment of this invention.

The access plan information table 7200 contains a node plan name 7201, a plan parent node name 7202, node processing 7203, an access data configuration 7204, a processing order 7205, and a node processing detail 7206.

The node plan name 7201 indicates the name of a node plan included in an access plan.

The plan parent node name 7202 indicates the name of a parent node plan associated with the node plan that is identified by the node plan name 7201. The node processing 7203 indicates what processing is performed by this node plan. The access data configuration 7204 indicates the name of the configuration of data accessed by this node plan.

The processing order 7205 indicates an order in which this node plan is processed. The column of the node processing detail 7206 holds details of the processing performed by this node plan.

FIG. 7B is a configuration diagram of the storage cache management table 7300 provided in the management server 1030 according to the embodiment of this invention.

The storage cache management table 7300 contains a storage ID 7301, a cache address 7302, a host ID 7303, a DBMS ID 7304, a hit count 7305, a logical unit number 7306, and an offset address 7307.

The storage ID 7301 is a unique identifier indicating the storage system 3000 whose cache memory 3003 stores data. The cache address 7302 indicates the address of a cache area where this data is stored.

The host ID 7303 is a unique identifier indicating the DBMS server 2000 that uses the cache area located at the address entered as the cache address 7302. The DBMS ID 7304 is a unique identifier indicating the DBMS 2008 that uses this cache area.

The hit count 7305 indicates how many times the DBMS 2008 identified by the DBMS ID 7304 accesses this cache area.

The logical unit number 7306 is a unique identifier indicating a logical unit that stores the same data as the one stored in this cache area. The offset address 7307 indicates the offset address of a part of the storage area of the physical disk 3006 that stores the same data as the one stored in this cache area.

FIG. 7C is a configuration diagram of the storage cache allocation management table 7400 provided in the management server 1030 according to the embodiment of this invention.

The storage cache allocation management table 7400 contains a storage ID 7401, a cache address 7402, and an allocated host ID 7403.

The storage ID 7401 is a unique identifier indicating the storage system 3000 that has the cache memory 3003 whose cache area is reallocated.

The cache address 7402 indicates the address of a cache area that is reallocated.

The allocated host ID 7403 is a unique identifier indicating the DBMS server 2000 to which the cache area located at the address entered as the cache address 7402 is newly allocated through the reallocation.

FIG. 7D is a configuration diagram of the DBMS statistics information table 7500 provided in the management server 1030 according to the embodiment of this invention.

The DBMS statistics information table 7500 contains a table/index name 7501, a string name 7502, a length 7503, and an entry count 7504.

The table/index name 7501 indicates the name of a table or of an index that is contained in a DB stored in the storage system 3000.

The string name 7502 indicates the name of a string of key values of the table or index identified by the table/index name 7501.

The length 7503 indicates the data length of the string identified by the string name 7502. The entry count 7504 indicates the count of entries of this string.

FIG. 7E is a configuration diagram of the configuration information table 7600 provided in the management server 1030 according to the embodiment of this invention.

The configuration information table 7600 contains a host ID 7601, a DBMS ID 7602, a schema name 7603, a schema type 7604, a schema size 7605, a data area ID 7606, a head offset address 7607, a logical unit number 7608, and a storage ID 7609.

The host ID 7601 is a unique identifier indicating the DBMS server 2000. The DBMS ID 7602 is a unique identifier indicating the DBMS 2008 operating on the DBMS server 2000.

The schema name 7603 indicates the name of a schema accessed by the DBMS 2008 that is identified by the DBMS ID 7602. The schema type 7604 indicates the type of the schema identified by the schema name 7603. "Table", "index", or the like is stored as the schema type 7604. The schema size 7605 is the size of this schema.

The data area ID 7606 is a unique identifier indicating a data area where this schema is stored. The head offset address 7607 indicates a value at the head of the offset address of a part of the storage area of the physical disk 3006 that stores this schema.

The logical unit number 7608 is a unique identifier indicating a logical unit where this schema is stored. The storage ID 7609 is a unique identifier indicating the storage system 3000 where this schema is stored.

FIG. 7F is a configuration diagram of the DBMS performance information table 7700 provided in the management server 1030 according to the embodiment of this invention.

The DBMS performance information table 7700 contains a DBMS ID 7701, a host ID 7702, throughput information 7703, and a maximum disk queue length 7704.

The DBMS ID 7701 is a unique identifier indicating the DBMS 2008 operating on the DBMS server 2000. The host ID 7702 is a unique identifier indicating the DBMS server 2000 on which the DBMS that is identified by the DBMS ID 7701 operates.

The throughput information 7703 indicates the processing speed of this DBMS 2008. The maximum disk queue length 7704 indicates a maximum value of the queue length of this DBMS 2008. The length of a queue is measured by the count of processing that is waiting for its turn to access a DB.

Figures 8A, 8B:
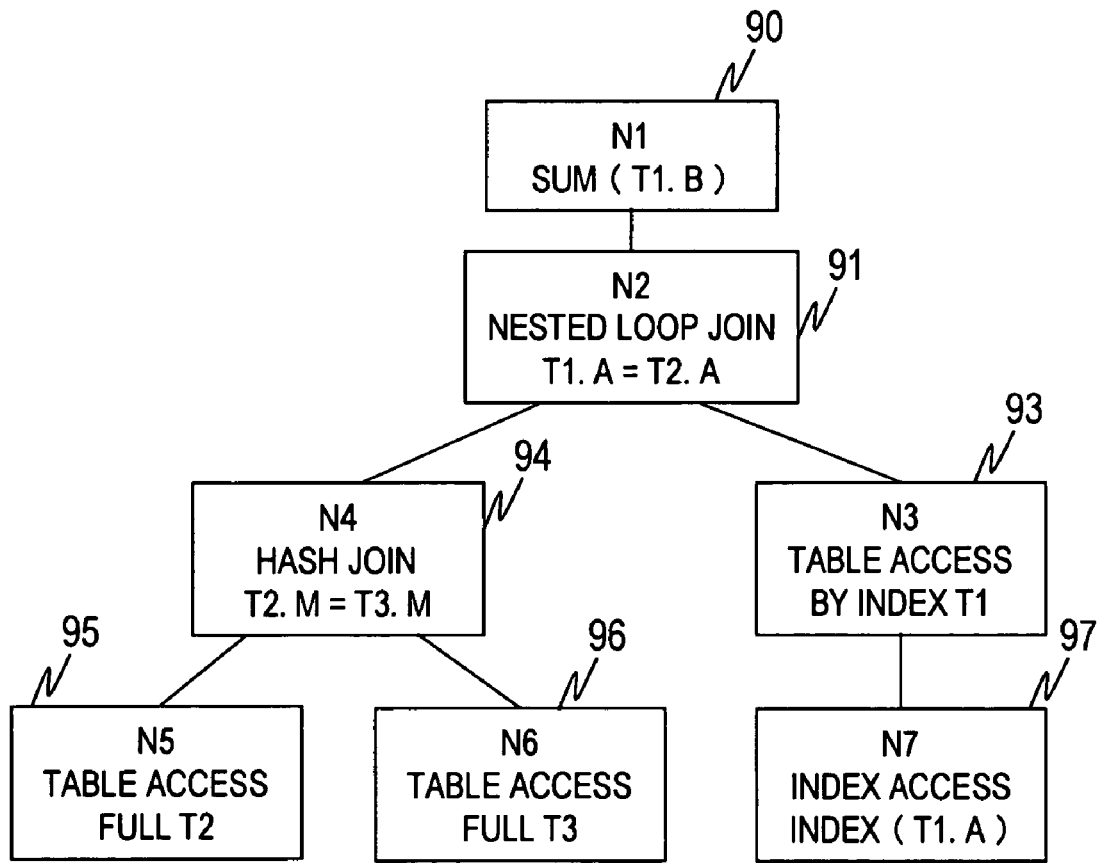
FIG. 8A is an explanatory diagram of a query executed by a DBMS of the DBMS server according to the embodiment of this invention.
FIG. 8B is an explanatory diagram of an access plan made by the DBMS according to the embodiment of this invention.

FIG. 8A is an explanatory diagram of a query 98 executed by the DBMS 2008 of the DBMS server 2000 according to the embodiment of this invention.

The query 98 is information with which a DB is requested of data.

Receiving the query 98 from the client program 2006, the DBMS 2008 analyzes the received query 98. Based on the result of the analysis, the DBMS 2008 creates an access plan.

FIG. 8B is an explanatory diagram of an access plan made by the DBMS 2008 according to the embodiment of this invention.

An access plan is composed of plural node plans denoted by 90 to 97. The node plans 90 to 97 each contain a node number, what processing is performed, and an access data configuration.

Examples of processing to combine plural tables include nested loop join, sort merge join, and hash join.

In the access plan of FIG. 8B, a table T2 and a table T3 are combined by hash join (the node plan 94). The table obtained as a result of the hash join is combined with a table T1 by nested loop join (the node plan 91).

Figure 9:
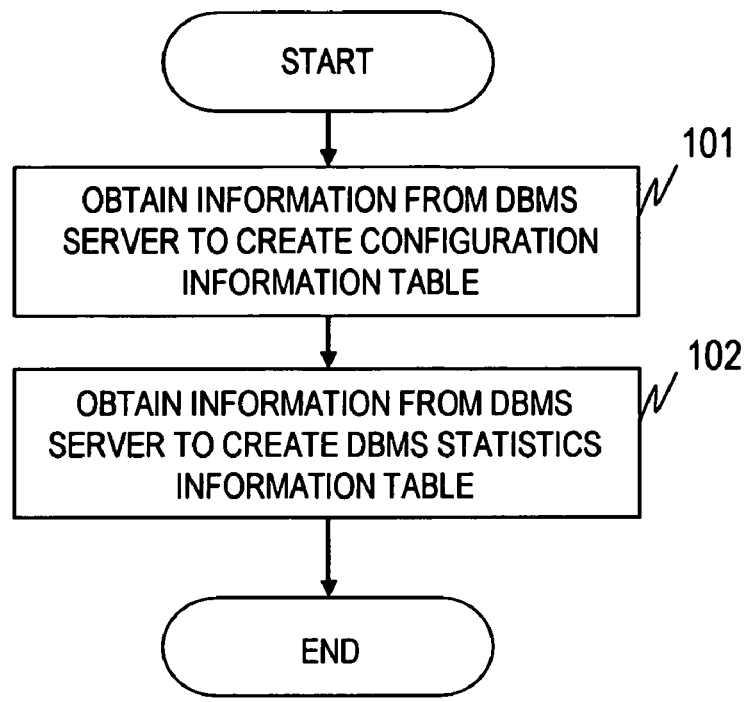
FIG. 9 is a flow chart for processing of updating the configuration information table and the DBMS statistics information table, which is executed by the management server according to the embodiment of this invention.

FIG. 9 is a flow chart for processing of updating the configuration information table 7600 and the DBMS statistics information table 7500 which is executed by the management server 1030 according to the embodiment of this invention.

The management manager 1050 of the management server 1030 obtains, from the DBMS server 2000, information for updating the configuration information table 7600.

Specifically, information held in the DB schema information table 5100 of the DBMS server 2000 is obtained from the DBMS server 2000. The manager 1050 then obtains, from the DBMS area information table 5400 of the DBMS server 2000, information in an entry whose offset address 5404 has a head value that matches the head offset address 5106 of the information obtained from the DB schema information table 5100.

The configuration information table 7600 is updated based on the obtained information (101).

To be specific, First, from which DBMS server 2000 those two pieces of information have been obtained is specified. Next, the identifier of the DBMS server 2000 specified is stored as the host ID 7601 in the configuration information table 7600.

Then the DBMS ID 5401 of the information obtained from the DBMS area information table 5400 is stored as the DBMS ID 7602 of the configuration information table 7600. The schema name 5102 of the information obtained from the DB schema information table 5100 is stored as the schema name 7603 of the configuration information table 7600.

Next, the schema type 5103 of the information obtained from the DB schema information table 5100 is stored as the schema type 7604 of the configuration information table 7600. The schema size 5105 of the information obtained from the DB schema information table 5100 is stored as the schema size 7605 of the configuration information table 7600.

Next, the data area ID 5104 of the information obtained from the DB schema information table 5100 is stored as the data area 7606 of the configuration information table 7600. The head offset address 5106 of the information obtained from the DB schema information table 5100 is stored as the head offset address 7607 of the configuration information table 7600.

Next, the logical unit number 5403 of the information obtained from the DBMS area information table 5400 is stored as the logical unit number 7608 of the configuration information table 7600. The storage ID 5402 of the information obtained from the DBMS area information table 5400 is stored as the storage ID 7609 of the configuration information table 7600.

The configuration information table 7600 is updated in the manner described above.

The manager 1050 next obtains, from the DBMS server 2000, information for updating the DBMS statistics information table 7500.

Specifically, information on a table or an index that is managed by the DBMS server 2000 in question is obtained. Information on a table or an index contains a table name or an index name, the name of a string of a key value, the length of the string, and the entry count of the string.

The DBMS statistics information table 7500 is updated based on the obtained information (102).

Then the processing of updating the configuration information table 7600 and the DBMS statistics information table 7500 is ended.

Figure 10:
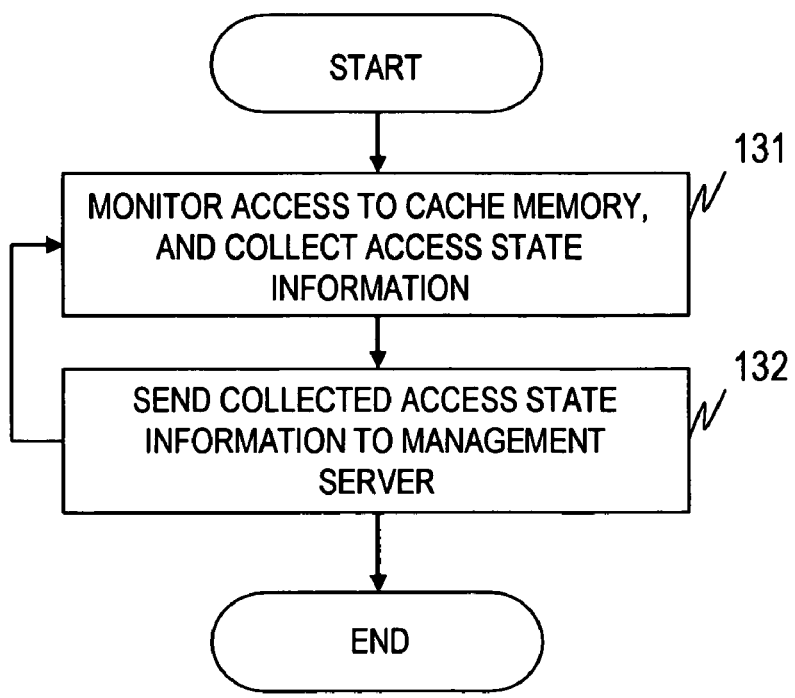
FIG. 10 is a flow chart for cache access state notifying processing executed by the storage system according to the embodiment of this invention.

FIG. 10 is a flow chart for a cache access state notifying processing which is executed by the storage system 3000 according to the embodiment of this invention.

The control manager 3001 of the storage system 3000 monitors access to the cache memory 3003 within a given period of time, and collects access state (cache access state) information (131). How long the access is monitored may be set in advance or designated by an administrator.

The cache access state information contains a cache address, a cache hit count, a host ID, a logical unit number, and an offset address.

The cache address is the address of a cache area that is used by the DBMS server 2000. The cache hit count is the number of times this cache area is accessed by the DBMS server 2000 (counter value information). The host ID is a unique identifier indicating the DBMS server 2000 that uses this cache area.

The logical unit number is a unique identifier indicating a logical unit that stores the same data as the one stored in this cache area. The offset address is the offset address of a part of the storage area of the physical disk 3006 that stores the same data as the one stored in this cache area.

Specifically, the control manager 3001 monitors the access to collect the cache address and the cache hit count. The control manager 3001 then chooses, from the cache allocation management table 8400, an entry whose cache address 8402 matches the collected cache address. From the chosen entry, the cache allocated host ID 8401 is obtained. The obtained host ID 8401 is set as the host ID in the cache access state information.

Next, the control manager 3001 chooses, from the cache data management table 8500, an entry whose cache address 8501 matches the collected cache address. From the chosen entry, the logical unit number 8502 and the offset address 8503 are obtained. The obtained logical unit number 8502 and the offset address 8503 are set as the logical unit number and the offset address in the cache access state information. Cache access state information is collected in this manner.

Next, the control manger 3001 sends the collected cache access state information to the management server 1030 (132). The cache access state notifying processing is hereby ended.

Figure 11:
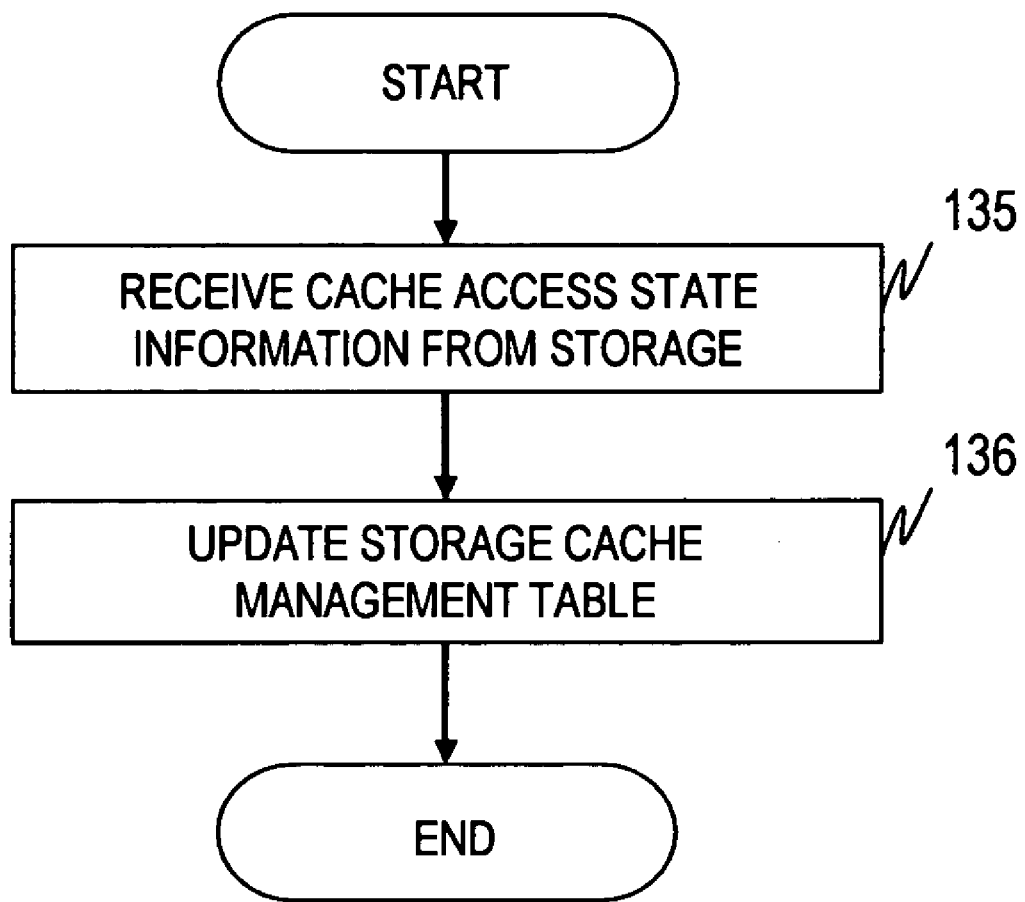
FIG. 11 is a flow chart for processing of updating the storage cache management table of the management server according to the embodiment of this invention.

FIG. 11 is a flow chart for processing of updating the storage cache management table 7300 of the management server 1030 according to the embodiment of this invention.

First, the management manager 1050 is notified of a cache access state by the storage system 3000 (135).

Then the manager 1050 updates the storage cache management table 7300 based on the received cache access state information (136).

Specifically, which storage system 3000 has sent the cache access state information is specified. The manager 1050 then stores the identifier of the specified storage system 3000 as the storage ID 7301 of the storage cache management table 7300.

Next, the cache address contained in the received cache access state information is stored as the cache address 7302 of the storage cache management table 7300. The host ID contained in the cache access state information is stored as the host ID 7303 of the storage cache management table 7300.

The manager 1050 then chooses, from the configuration information table 7600, an entry whose head offset address 7607 matches a value at the head of the cache memory information contained in the received cache access state information. From the chosen entry, the DBMS ID 7602 is obtained. The obtained DBMS ID 7602 is stored as the DBMS ID 7304 of the storage cache management table 7300.

Next, the cache hit count contained in the received cache access state information is stored as the cache hit count 7305 of the storage cache management table 7300. The logical unit number contained in the cache access state information is stored as the logical unit number 7306 of the storage cache management table 7300. Next, the offset address contained in the received cache access state information is stored as the offset address 7307 of the storage cache management table 7300.

The storage cache management table 7300 is updated in the manner described above, and the updating processing is ended.

Figure 12:
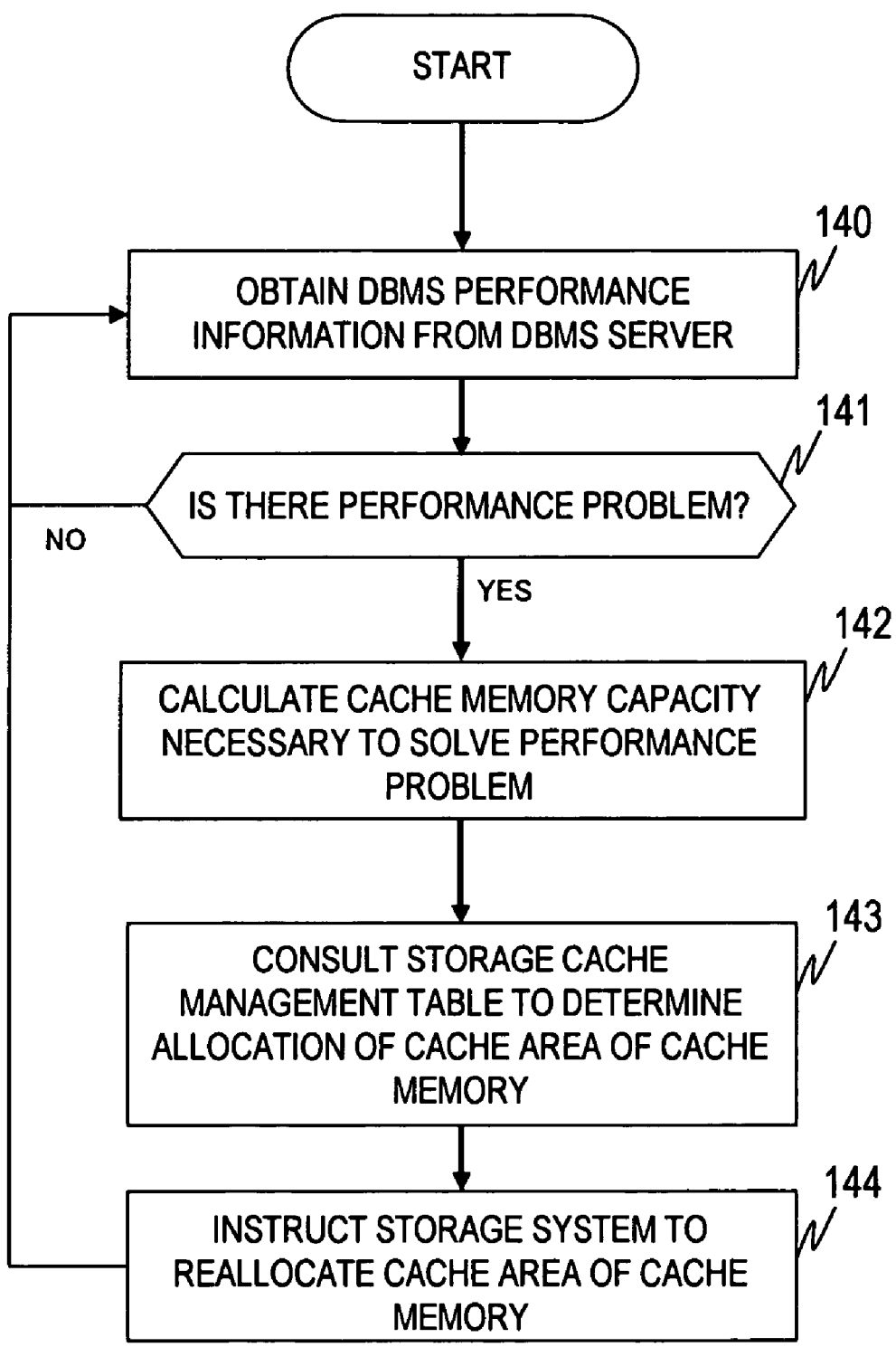
FIG. 12 is an explanatory diagram of a cache memory reallocating processing of the management server according to the embodiment of this invention.

FIG. 12 is an explanatory diagram of cache memory reallocating processing of the management server 1030 according to the embodiment of this invention.

The management manager 1050 of the management server 1030 regularly obtains information on the performance of the DBMS 2008 from the DBMS server 2000 (140).

The manager 1050 updates the DBMS performance information table 7700 based on the obtained information on the performance of the DBMS 2008. Then the updated DBMS performance information table 7700 is consulted to judge whether the DBMS 2008 is having a performance trouble or not (141). The management manager 1050 judges that there is a performance problem in the DBMS 2008 when, for example, the number of times a trouble has occurred exceeds a threshold.

One of causes of a performance problem is that the capacity of the cache memory 3003 that is allocated to the DBMS 2008 is not enough.

Specifically, the controller 3005 of the storage system 3000 deletes data from the cache memory 3003 following an LRU algorithm or the like when there is no room left in the cache memory 3003 to store data accessed by the DBMS 2008. Then the controller 3005 stores the data in the thus created free area of the cache memory 3003.

In the case where data accessed by the DBMS 2008 is not in the cache memory 3003, the controller 3005 accesses the physical disk 3006. This delays processing of the DBMS 2008 since accessing the physical disk 3006 takes time.

In short, when the cache memory 3003 does not have enough free area left, the number of times the controller 3005 accesses the physical disk 3006 is increased. As a result, processing of the DBMS 2008 is delayed and a performance problem arises in the DBMS 2008.

When the DBMS 2008 does not have a performance problem, there is no need to reallocate cache areas of the cache memory 3003 and the processing returns to the step S140.

On the other hand, when the DBMS 2008 has a performance problem, it is judged that cache areas of the cache memory 3003 have to be reallocated. Accordingly, the manager 1050 calculates how much capacity of the cache memory 3003 is necessary to solve the performance problem of the DBMS 2008 (142).

For example, a method described in JP 2004-295790 A is employed to calculate how much capacity of the cache memory 3003 is necessary to solve the performance problem of the DBMS 2008. Specifically, which data is accessed by the DBMS 2008 to solve the performance problem is determined from the past performance information of the DBMS 2008. Then the manager 1050 calculates how much capacity of the cache memory 3003 is necessary to access the data determined. The thus calculated capacity is employed as a capacity of the cache memory 3003 that is necessary to solve the performance problem.

The management manager 1050 next consults the storage cache management table 7300 to determine allocation of cache areas of the cache memory 3003 (143). How cache areas of the cache memory 3003 are allocated is determined such that the calculated capacity of the cache memory 3003 is allocated to the DBMS 2008 that is having a performance problem.

For instance, the management manager 1050 allocates cache areas of the cache memory 3003 such that a cache area where data that has been accessed by the DBMS 2008 and is no longer needed is stored is allocated to the DBMS 2008 that is having a performance problem.

Specifically, the management manager 1050 extracts the storage ID 7301, the cache address 7302, a logical unit number 7306, and the offset address 7307 in an order of entry of the storage cache management table 7300.

The manager 1050 next chooses, from the configuration information table 7600, an entry whose logical unit number 7608 matches the extracted logical unit number 7306, and whose head offset address 7607 matches a value at the head of the extracted offset address 7307. From the chosen entry, the schema name 7603 is extracted.

Thus obtained is the schema name of data stored in a cache area that is determined by the extracted storage ID 7301 and cache address 7302.

Access information of the DBMS 2008 is obtained next. The access information contains the storage ID, logical unit number, and offset address of a part of the storage area of the physical disk 3006 that is accessed by the DBMS 2008.

The obtained access information and the access plan information table 7200 are consulted to specify, from an access plan, where the DBMS 2008 is currently accessing.

Based on the specified location, the manager 1050 judges whether or not the DBMS 2008 has already accessed the data stored in the cache area that is determined by the extracted storage ID 7301 and cache address 7302. Here, once accessed by the DBMS 2008, data is regarded as no longer needed.

Then the manager 1050 allocates cache areas of the cache memory 3003 such that a cache area where data that is no longer needed is stored is preferentially allocated to the DBMS 2008 where a problem has occurred. In other words, the cache area that is determined by the extracted storage ID 7301 and cache address 7302 is preferentially allocated to the DBMS 2008 that is having a performance problem.

The management manager 1050 may also determine allocation of cache areas of the cache memory 3003 based on the access count of a cache area.

Specifically, the following processing is repeated until a capacity necessary to solve a performance problem is allocated to the DBMS 2008.

First, entries are chosen from the storage cache management table 7300 in ascending order of the hit count 7305. From each entry chosen, the storage ID 7301 and the cache address 7302 are extracted.

Then a cache area that is determined by the extracted storage ID 7301 and cache address 7302 is allocated to the DBMS 2008 that is having a performance problem.

An example is given in which a capacity of the cache memory 3003 that is necessary to solve the performance problem is 100 MB. In this case, the management manager 1050 allocates a cache area for which "1" is entered as the hit count 7305 in the storage cache management table 7300. Then the manager 1050 judges whether or not the total capacity of all cache areas for which "1" is entered as the hit count 7305 in the storage cache management table 7300 is smaller than 100 MB. When the total capacity is smaller than 100 MB, the manager 1050 adds, to cache areas to be allocated to the DBMS 2008, a cache area for which "2" is entered as the hit count 7305 in the storage cache management table 7300. In this way, the hit count 7305 of a cache area to be allocated is incremented by 1. This enables the management manager 1050 to allocate a cache area storing data that is accessed less frequently to the DBMS 2008 that is having a performance problem.

Here, cache areas are allocated to the DBMS 2008 in ascending order of data access frequency. Allocation of cache areas of the cache memory 3003 may be determined such that a cache area storing data whose access frequency is equal to or larger than a threshold is not allocated to the DBMS 2008.

Once allocation of cache areas of the cache memory 3003 is determined in the manner described above, the manager

1050 instructs the storage system 3000 to reallocate cache areas as determined (144). Then the manager 1050 returns to the step S140 to repeat this processing.

Figure 13:
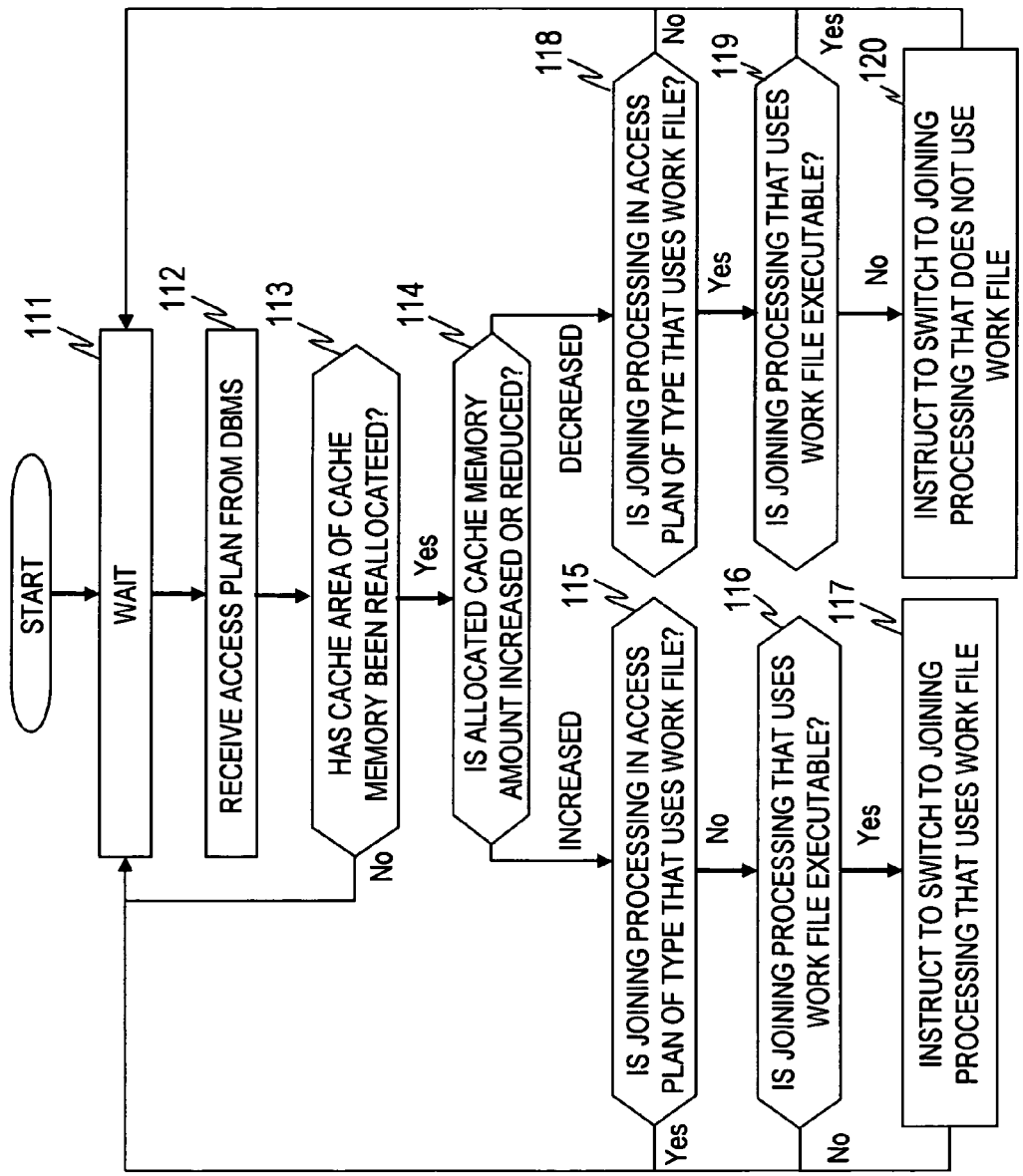
FIG. 13 is an explanatory diagram of access plan changing processing of the management server according to the embodiment of this invention.

FIG. 13 is an explanatory diagram of access plan changing processing of the management server 1030 according to the embodiment of this invention.

The management manager 1050 of the management server 1030 waits for a notification of an access plan from the DBMS 2008 of the DBMS server 2000 (111).

The DBMS 2008 creates an access plan and, before executing the access plan, sends the access plan to the management server 1030.

Receiving the access plan from the DBMS 2008 (112), the management manager 1050 judges whether or not cache areas of the cache memory 3003 have been reallocated (113). Specifically, the manager 1050 judges that cache areas of the cache memory 3003 have been reallocated when there is a new entry added to the storage cache allocation management table 7400.

When it is judged that cache areas of the cache memory 3003 have not been reallocated, there is no need to change the current access plan and the manager 1050 returns to the step S111.

On the other hand, when it is judged that cache areas of the cache memory 3003 have been reallocated, the storage cache management table 7300 is consulted to obtain how much capacity of the cache memory 3003 is currently allocated to the DBMS 2008 in question (current allocation amount). Similarly, how much capacity of the cache memory 3003 has been allocated to this DBMS 2008 prior to the reallocation of cache areas of the cache memory 3003 (past allocation amount) is obtained.

The management manager 1050 then compares the obtained current allocation amount against the obtained past allocation amount to judge whether the cache allocated amount of this DBMS 2008 is increased or reduced (114).

When judging that it is an increase in cache allocated amount, the manager 1050 analyzes the received access plan to judge whether joining processing contained in the received access plan is of the type that uses a work file or not (115).

Specifically, the management manager 1050 judges whether or not processing that uses a work file is stored as the node processing 7203 in the access plan information table 7200. An example is given in which hash join or sort merge join is processing that uses a work file. In this case, the management manager 1050 judges whether or not hash join or sort merge join is stored as the node processing 7203 in the access plan information table 7200.

When joining processing contained in the access plan is of the type that uses a work file, there is no need to change the access plan and the manager 1050 returns to the step S111.

On the other hand, when joining processing contained in the access plan is processing that does not use a work file, the manager 1050 obtains how much capacity of the cache memory 3003 is necessary in executing the joining processing that uses a work file.

Specifically, a necessary capacity is obtained based on characteristics of the respective types of joining processing. For instance, hash join, which uses a work file, is characterized by reading all corresponding entries of tables to be combined, creating a hash table from the read data with the use of a work file, and performing joining processing.

The management manager 1050 compares the obtained necessary capacity against the current allocation amount to judge whether or not the DBMS 2008 is capable of carrying out joining processing that uses a work file (116). Specifically, the DBMS 2008 is judged as being capable of executing joining processing that uses a work file when the necessary memory capacity is equal to or larger than the current allocation amount.

When the DBMS 2008 is judged as being incapable of executing joining processing that uses a work file, the access plan does not need to be changed and the manager 1050 returns to the step S111.

On the other hand, when the DBMS 2008 is judged as being capable of executing joining processing that uses a work file, the manager 1050 instructs to change the access plan. Specifically, the manager 1050 instructs to switch the joining processing that is contained in the access plan received in the step S112 to joining processing that uses a work file (117).

The management manager 1050 next notifies the administrator of the change of access plan. Specifically, the manager 1050 has the output device 1032 of the management server 1030 display an access plan change notification screen. The manager 1050 then returns to the step S111.

Figure 14:
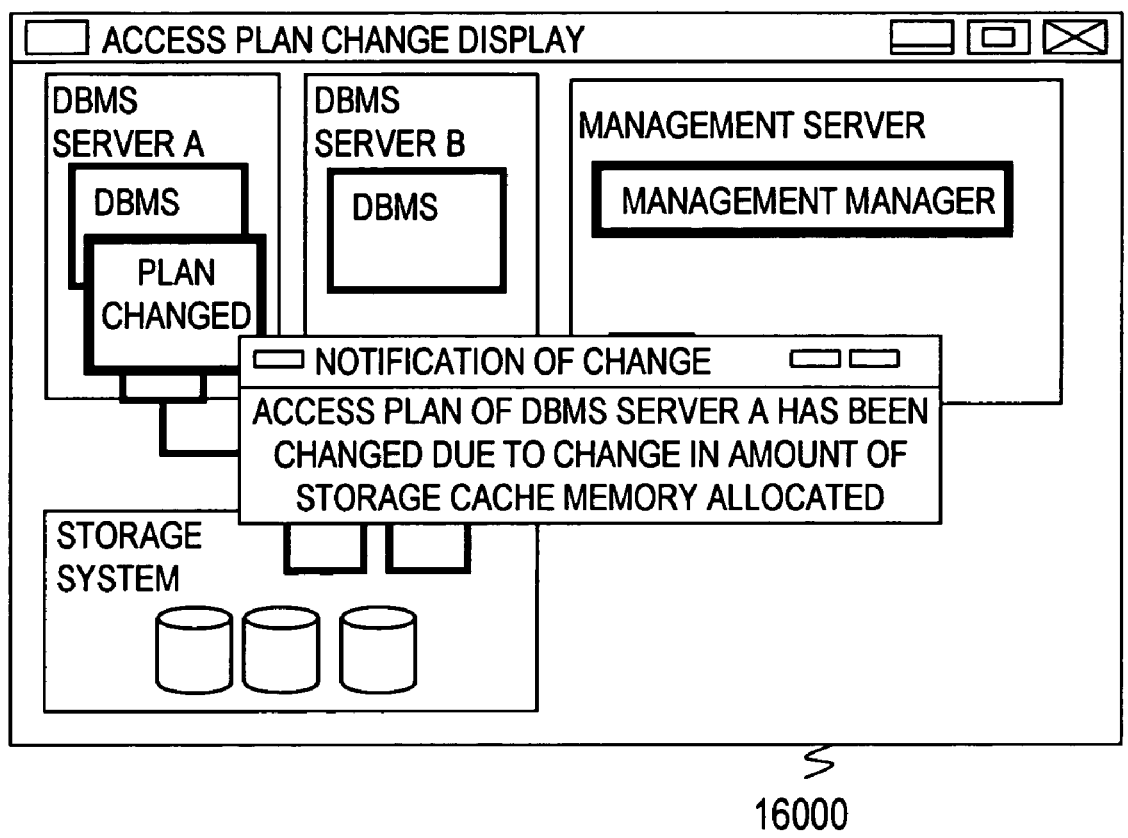
FIG. 14 is an explanatory diagram of an access plan change notification screen displayed by an output device of the management server according to the embodiment of this invention.

FIG. 14 is an explanatory diagram of the access plan change notification screen displayed by the output device 1032 of the management server 1030 according to the embodiment of this invention.

The access plan change notification screen is used to notify the administrator that the access plan of the DBMS server 2000 has been changed. With this screen, the administrator knows a change of access plan of the DBMS server 2000.

Now, back to FIG. 13, when judging in the step S114 that there is a reduction in cache allocation amount, the management manager 1050 analyzes the received access plan to judge whether joining processing contained in the received access plan is of the type that uses a work file or not (118).

When the joining processing contained in the access plan is of the type that does not use a work file, there is no need to change the access plan and the manager 1050 returns to the step S111.

On the other hand, when the joining processing contained in the access plan is of the type that uses a work file, the manager 1050 judges whether the DBMS 2008 is capable of executing this joining processing or not (119).

When the DBMS 2008 is judged as being capable of executing the joining processing that uses a work file, there is no need to change the access plan and the manager 1050 returns to the step S111.

On the other hand, when the DBMS 2008 is judged as being incapable of executing the joining processing that uses a work file, the manager 1050 instructs to change the access plan. Specifically, the manager 1050 instructs to switch the joining processing that is contained in the access plan received in the step S112 to joining processing that does not use a work file (120).

The management manager 1050 next notifies the administrator of the change of access plan. Specifically, the manager 1050 has the output device 1032 of the management server 1030 display the access plan change notification screen of FIG. 14. The manager 1050 then returns to the step S111.

In this embodiment, the DBMS 2008 executes an access plan only after sending the access plan to the management manager 1050. Receiving the access plan, the management manger 1050 instructs the DBMS 2008 to change the access plan according to a change in amount of cache offset allocated to the DBMS 2008.

The management manager 1050 may also obtain an access plan that is being executed by the DBMS 2008 and instruct the DBMS 2008 to change the obtained access plan.

According to this embodiment, upon detection of a performance problem in the DBMS 2008, the management server 1030 reallocates cache areas of the cache memory 3003 of the storage system 3000. The management server 1030 then instructs the DBMS 2008 to change an access plan executed by the DBMS 2008 according to a change in amount of cache allocated to the DBMS 2008. The DBMS 2008 can thus switch to an access plan that makes high-speed processing possible.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
   at least one of database computers, in which a database management system operates, which has an interface connected to a network, a processor connected to the interface, and a memory connected to the processor, wherein an access plan used to execute database queries is provided;
   a storage system for storing a database operated by the database management system, which has an interface connected to the network, a controller connected to the interface, a cache memory for storing data temporarily, and a physical disk drive for storing the database; and
   a management computer for managing the database computer and the storage system, which has an interface connected to an another apparatus, a processor connected to the interface, and a memory connected to the processor,
   wherein the management computer:
      changes capacity of the cache memory which is allocated to the database computer where the database management system operates; and
      instructs the database management system to change the access plan according to the change in capacity of the cache memory allocated to the database computer.

2. The computer system according to claim 1, wherein the management computer:
   instructs the database management system to switch to an access plan that uses a large capacity of the cache memory when the capacity of the cache memory allocated to the database computer is increased; and
   instructs the database management system to switch to an access plan that uses a small capacity of the cache memory when the capacity of the cache memory allocated to the database computer is decreased.

3. The computer system according to claim 1, wherein, when performance of one of the database management system is reduced, the management computer changes the capacity of the cache memory allocated to the database computer in which the database management system having a performance problem operates by allocating an area of the cache memory that stores data that is no longer used by another database management system, which does not have a performance problem, to the database computer in which the database management system having a performance problem operates.

4. The computer system according to claim 1, wherein, when performance of one of the database management system is reduced, the management computer changes the capacity of the cache memory allocated to the database computer in which the database management system having a performance problem operates while keeping from reallocating cache memory areas where data that is frequently accessed by the database management system is stored.

5. The computer system according to claim 4, wherein the management computer:
   monitors an access frequency indicating how frequently the database management system accesses the cache memory;
   stores the monitored access frequency; and
   changes the capacity of the cache memory allocated to the database computer based on the stored access frequency.

6. A management computer for managing at least one of database computers and a storage system, the management computer comprising, an interface connected to the management network, a processor connected to the interface, and a memory connected to the processor,
   the database computer having a database management system operating therein, and implementing an access plan that is configured to execute a database query;
   the storage system having a cache memory for storing data temporarily and a physical disk drive for storing a database operated by the database management system,
   wherein the management computer:
      changes capacity of the cache memory which is allocated to the database computer where the database management system operates; and
      instructs the database management system to change the access plan according to the change in capacity of the cache memory allocated to the database computer.

7. The management computer according to claim 6, wherein the management computer;
   instructs the database management system to switch to the access plan that uses a large capacity of the cache memory, when the capacity of the cache memory allocated to the database computer is increased; and
   instructs the database management system to switch to the access plan that uses a small capacity of the cache memory when the capacity of the cache memory allocated to the database computer is reduced.

8. The management computer according to claim 6, wherein, when performance of one of the database management system is reduced, the management computer changes the capacity of the cache memory allocated to the database computer in which the database management system having a performance problem operates by allocating an area of the cache memory that stores data that is no longer used by another database management system, which does not have a performance problem, to the database computer in which the database management system having a performance problem operates.

9. The management computer according to claim 6, wherein, when performance of one of the database management system is reduced, the management computer changes the capacity of the cache memory allocated to the database computer in which the database management system having a performance problem operates while keeping from reallocating cache memory areas where data that is frequently accessed by the database management system is stored.

10. The management computer according to claim 9, wherein the management computer:
    monitors an access frequency indicating how frequently the database management system accesses the cache memory;
    stores the monitored access frequency; and
    changes the capacity of the cache memory allocated to the database computer based on the stored access frequency.

11. A method for controlling a database management system in a computer system that includes: at least one of database computers, in which the database management system operates; a storage system for storing a database operated by the database management system; and a management computer for managing the database computer and the storage system, the storage system having a cache memory for storing data temporarily and a physical disk drive for storing the database, the method, which is executed by the management computer, comprising the steps of:

changing capacity of the cache memory which is allocated to the database computer where the database management system operates; and instructing the database management system to change an access plan according to the change in capacity of the cache memory allocated to the database computer, wherein the access plan is configured to execute a database query.

12. The database management system controlling method according to claim 11, further comprising the steps of:

instructing the database management system to switch to the access plan that uses a large capacity of the cache memory when the capacity of the cache memory allocated to the database computer is increased, and instructing the database management system to switch to the access plan that uses a small capacity of the cache memory when the capacity of the cache memory allocated to the database computer is decreased.

13. The database management system controlling method according to claim 11, further comprising the steps of, when performance of one of the database management system is reduced, changing the capacity of the cache memory allocated to the database computer in which the database management system having a performance problem operates by allocating an area of the cache memory that stores data that is no longer used by another database management system, which does not have a performance problem, to the database computer in which the database management system having a performance problem operates.

14. The database management system controlling method according to claim 11, further comprising the steps of, when performance of one of the database management system is reduced, changing the capacity of the cache memory allocated to the database computer in which the database management system having a performance problem operates while keeping from reallocating cache memory areas where data that is frequently accessed by the database management system is stored.

15. The database management system controlling method according to claim 14, further comprising the steps of:

monitoring an access frequency indicating how frequently the database management system accesses the cache memory;

storing the monitored access frequency; and changing the capacity of the cache memory allocated to the database computer based on the stored access frequency.

16. The computer system according to claim 3, wherein when the management computer changes the capacity of the allocated cache memory, the management computer:

refers to the storage cache management table;

extracts a storage ID and a cache address, each corresponding to a cache area to be assigned;

specifies a location to be accessed by a DBMS based on acquired access information and the access plan specified from the access plan information table;

judges whether data stored in the cache area has already been accessed or not based on the specified location; and preferentially allocates the cache area to the DBMS in which a performance problem occurs when the data stored in the cache area has already been accessed.

17. The computer system according to claim 4, wherein when the management computer determines that the assignment capacity of the cache memory is increased, then the management computer:

determines whether the access plan uses a work file to execute a join operation; and obtains a capacity of the cache memory sufficient to provide a work file to execute a join operation, when it is determined that the access plan does not use a work file to execute a join operation.

18. The computer system according to claim 17, wherein information in an access plan information table is used to determine whether or not the access plan uses a work file to execute a join operation.

19. The computer system according to claim 18, wherein the join operation is either a hash join operation or a sort-merge join operation.

20. The computer system according to claim 18 wherein for a join operation that is a hash join operation, wherein when the access plan does not use a work file to execute the hash join operation, the management computer:

reads all corresponding entries of tables to be joined;

creates a hash table from the read data using a work file; and performs the join operation, thereby determining a necessary capacity of the cache memory.

21. The computer system according to claim 20 wherein the management computer further:

determines whether the DBMS can execute the join operation using the work file based on a currently assigned capacity of the cache memory and the obtained necessary capacity; and instructs a change to be made in order to modify the access plan to use a work file when the obtained necessary capacity is equal to or exceeds the currently assigned capacity.

* * * * *